United States Patent
Shinya et al.

(10) Patent No.: US 8,697,284 B2
(45) Date of Patent: Apr. 15, 2014

(54) NEGATIVE ELECTRODE MATERIAL FOR LITHIUM ION BATTERIES

(71) Applicant: Shin-Etsu Chemical Co., Ltd., Tokyo (JP)

(72) Inventors: Naofumi Shinya, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/675,256

(22) Filed: Nov. 13, 2012

(65) Prior Publication Data

US 2013/0122368 A1 May 16, 2013

(30) Foreign Application Priority Data

Nov. 15, 2011 (JP) .................. 2011-249620

(51) Int. Cl.
*H01M 4/38* (2006.01)
*H01M 4/04* (2006.01)

(52) U.S. Cl.
USPC .................. 429/218.1; 420/581; 420/578

(58) Field of Classification Search
None
See application file for complete search history.

(56) References Cited

U.S. PATENT DOCUMENTS

| 2003/0134198 A1* | 7/2003 | Sawa et al. .................. 429/221 |
| 2007/0020521 A1 | 1/2007 | Obrovac et al. |
| 2009/0061322 A1 | 3/2009 | Kawakami et al. |
| 2009/0155676 A1* | 6/2009 | Zhamu et al. ................. 429/129 |
| 2010/0167126 A1* | 7/2010 | Christensen et al. ......... 429/220 |
| 2012/0129049 A1 | 5/2012 | Rayner |

FOREIGN PATENT DOCUMENTS

| GB | 2 470 056 A | 11/2010 |
| JP | 6-325764 A | 11/1994 |
| JP | 4752996 B2 | 8/2011 |
| JP | 4789032 B2 | 10/2011 |
| WO | 2004/086539 A1 | 10/2004 |

OTHER PUBLICATIONS

Extended European Search Report dated Feb. 7, 2014, issued in European Patent Application No. 12192297.5, (6 pages).
Sun Z.B. et al., "Electrochemical properties of melt-spun Al-Si-Mn alloy anodes for lithium-ion batteries", Journal of Power Sources, Elsevier B.V., 2008, pp. 353-358, vol. 182, cited in Extended European Search Report dated Feb. 7, 2014.

* cited by examiner

*Primary Examiner* — Patrick Ryan
*Assistant Examiner* — Christopher Domone
(74) *Attorney, Agent, or Firm* — Westerman, Hattori, Daniels & Adrian, LLP

(57) ABSTRACT

A negative electrode material is provided for lithium ion batteries offering a high capacity and a long cycle life. It is an alloy material consisting essentially of Si, Al, M1, and M2 wherein M1 is a transition metal, and M2 is a metal element of Groups 4 and 5, and having an Si—Al-M1-M2 alloy phase constituting fine crystal grains and an Si phase precipitating along crystal grain boundaries to form a network.

11 Claims, 5 Drawing Sheets

EXAMPLE 1-2 (CONTAINING Ti)

CAST SAMPLE

QUENCHED SAMPLE

EXAMPLE 1-2 (CONTAINING Ti)

COMPARATIVE EXAMPLE 1-3 (FREE OF Ti)

Si₆₀Al₁₅Co₁₀Ti₁₅ ALLOY (EXAMPLE 3-2)

Si₆₀Al₂₅Ti₁₅ ALLOY (COMPARATIVE EXAMPLE 3-1)

Si₆₀Al₁₅Fe₁₀V₁₅ ALLOY (EXAMPLE 3-4)

Si₆₀Al₂₅Fe₁₅ ALLOY (COMPARATIVE EXAMPLE 1-3)

NEGATIVE ELECTRODE MATERIAL FOR LITHIUM ION BATTERIES

CROSS-REFERENCE TO RELATED APPLICATION

This non-provisional application claims priority under 35 U.S.C. §119(a) on Patent Application No. 2011-249620 filed in Japan on Nov. 15, 2011, the entire contents of which are hereby incorporated by reference.

TECHNICAL FIELD

This invention relates to a negative electrode material for lithium ion batteries, especially useful in high-capacity applications.

BACKGROUND ART

Prior art rechargeable batteries including lead rechargeable batteries, Ni—Cd batteries and nickel-hydrogen batteries perform charge/discharge operation on the basis of ionization reaction of hydrogen ($H \rightarrow H^+ + e^-$) and migration of proton in aqueous electrolyte whereas lithium ion batteries carry out charge/discharge operation on the basis of ionization of lithium ($Li \rightarrow Li^+ + e^-$) and migration of resultant lithium ions.

These lithium ion batteries allow for discharge at a higher voltage than the prior art rechargeable batteries since lithium metal has a potential of 3 volts relative to the standard oxidation-reduction potential. In addition, lithium responsible for oxidation-reduction is lightweight, which combined with the high discharge voltage, provides for an energy density per unit weight surpassing that of the prior art rechargeable batteries.

Due to the lightweight and high capacity advantages, the lithium ion batteries are widely used in currently widespreading mobile equipment which require rechargeable batteries for operation, typically laptop computers and mobile phones. The lithium ion batteries now find an ever expanding application field toward the region where large current discharge is necessary on outdoor use, such as power tools, hybrid cars and electric vehicles.

To make electric vehicles and electric motorcycles practically acceptable, their travel distance must be extended. Thus batteries must have a higher capacity. The capacity of lithium ion batteries, however, can be increased to 372 mAh/g at maximum since the mainstream of the negative electrode material currently used therein is graphite. Under the circumstances, metallic materials such as metallic silicon (Si) and metallic tin (Sn) are investigated as a new negative electrode material. Since the theoretical capacity (4200 mAh/g) of silicon is at least 10 times greater than that of graphite, many engineers made research efforts on silicon.

Metallic silicon, however, undergoes substantial expansion and contraction upon charge/discharge cycles, which causes powdering and disconnection of conductive networks, reducing the cycle life. Addressing the problem, engineers made a study on alloying and mechanical alloying for amorphizing (see JP 4752996 and JP 4789032), but fail in mass-scale manufacture. This is because the mechanical alloying technology is intended to prepare small amounts of samples at the laboratory level and thus incompatible with mass-scale production.

CITATION LIST

Patent Document 1: JP 4752996
Patent Document 2: JP 4789032

SUMMARY OF INVENTION

An object of the invention is to provide a negative electrode material for lithium ion batteries, having benefits of high capacity and long cycle life.

The inventors have found that when an Si—Al base alloy is modified by substituting a transition metal and a metal of Group 4 or 5 in the Periodic Table for a part of Si, a composite alloy in which Si phase precipitates along boundaries of fine crystal grains of Si alloy phase as networks is obtained by melting a raw material for the alloy and rapidly solidifying the melt; and that when this composite alloy is used as the negative electrode material to construct a lithium ion battery, the lithium ion battery is improved in cycle life.

In one aspect, the invention provides a negative electrode material for lithium ion batteries, which is an alloy material consisting essentially of Si, Al, M1, and M2 as constituent elements wherein M1 is at least one element selected from the transition metals exclusive of Groups 4 and 5 in the Periodic Table, and M2 is at least one metal element selected from Groups 4 and 5 in the Periodic Table, and having an Si—Al-M1-M2 alloy phase constituting fine crystal grains and an Si phase precipitating along boundaries of the crystal grains to form a network.

Typically, M1 is an element selected from the group consisting of Fe, Ni, Co, and Mn. Also typically, M2 is an element selected from the group consisting of Ti, V, Zr, Nb, and Ta.

In a preferred embodiment, the alloy material consists essentially of 40 to 70 at % of Si, 1 to 25 at % of Al, 5 to 35 at % of M1, and 1 to 20 at % of M2. Also preferably, the Si—Al-M1-M2 alloy has a titanium content of 1 to 20 at %. Further preferably, the crystal grains has a size of 1 to 500 nm and are spaced apart a distance of up to 200 nm.

In a preferred embodiment, the negative electrode material is prepared by the rapid solidification process. Also preferably, the alloy material is in particulate form having an average particle size of less than or equal to 4 µm.

Advantageous Effects of Invention

The negative electrode material provides a lithium ion battery with a high capacity owing to the inclusion of an Si phase in the alloy material. Since the Si phase precipitates along grain boundaries to form a network, neither powdering nor disconnection of conductive network can occur even when the Si phase undergoes expansion and contraction during charge/discharge cycles, resulting in an extended cycle life. Additionally, crystal gains of the Si—Al-M1-M2 alloy phase in the alloy material are highly conductive in contrast to pure Si, which eliminates a need for conductive treatment or addition of conductive agent and increases the energy density per volume of a lithium ion battery. Therefore, a lithium ion battery using the negative electrode material is best suited as the power supply with a high capacity and durability for electric vehicles.

DESCRIPTION OF PREFERRED EMBODIMENTS

Figure 1A:
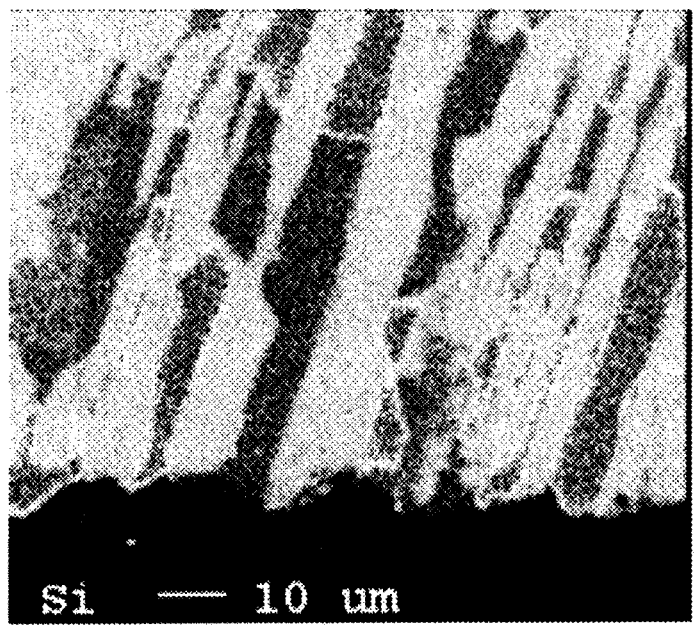
FIG. 1 is a mapping image showing a Si distribution by EPMA observation in cross section of alloy samples in Example 1-2, FIG. 1(a) showing the Si distribution of a cast alloy sample and FIG. 1(b) showing the Si distribution of a rapidly solidified alloy sample.

The negative electrode material for lithium ion batteries in one embodiment of the invention is an alloy material consisting essentially of Si, Al, M1, and M2 as constituent elements wherein M1 is at least one element selected from the transition metals exclusive of Groups 4 and 5 in the Periodic Table, and M2 is at least one metal element selected from Groups 4 and 5 in the Periodic Table, and having an Si—Al-M1-M2 alloy phase constituting fine crystal grains and an Si phase precipitating along boundaries of the crystal grains to form a network.

Of the constituent elements, silicon (Si) is a negative electrode active species as the base of the negative electrode material. The critical feature of the alloy material that constitutes the negative electrode material is the precipitation of a Si phase in the alloy material. When a lithium ion battery is constructed and operated in charge/discharge cycles, lithium ions are withdrawn from the positive electrode active material and embedded into the negative electrode active material during charging. If the negative electrode active material is graphite having a layer structure, lithium ions are intercalated between layers in the form of $LiC_6$. In contrast, lithium ions are taken into the Si phase via alloying in the form of $Li_{4.4}Si$, but little into the Si—Al-M1-M2 alloy phase which has been alloyed. It is thus recognized that absent Si alone in the alloy, the alloy material does not function as negative electrode.

Based on this recognition, the alloy composition should preferably have a Si content of 40 to 70 at %, more preferably 50 to 70 at %, and even more preferably 60 to 70 at %. An Si content of less than 40 at % means that the alloy material contains little Si alone and may not function as negative electrode. With an Si content in excess of 70 at %, the Si phase may not maintain the network structure in the alloy material, leading to a short life.

Aluminum (Al) is an element that forms a Si—Al base alloy phase and provides for electric conduction. The alloy composition should preferably have an Al content of 1 to 25 at %, more preferably 8 to 25 at %. An Al content of less than 1 at % may make it difficult to form sufficient crystal grains of Si—Al base alloy phase and hence, to maintain conductivity whereas an Al content in excess of 25 at % may interfere with Si phase formation.

The metal element M1 is at least one element selected from the transition metals exclusive of Groups 4 and 5 in the Periodic Table. Specifically M1 is selected from Sc, Cr, Mn, Fe, Co, Ni, Cu, Y, Mo, Tc, Ru, Rh, Pd, Ag, lanthanoid elements such as La and Ce, W, Re, Os, Ir, Pt, and Au. Preferably M1 is Fe, Ni, Co or Mn. The alloy composition should preferably have a transition metal M1 content of 5 to 35 at %, more preferably 7 to 20 at %. An M1 content of less than 5 at % may make it difficult to prevent segregation of Si (or difficult refinement of Si phase), leading to degraded durability of the negative electrode material against charge/discharge cycles of a lithium ion battery. An M1 content in excess of 35 at % may interfere with Si phase formation.

The metal element M2 is at least one element selected from the metal elements of Groups 4 and 5 in the Periodic Table. Specifically M2 is selected from Ti, V, Zr, Nb, Hf, and Ta. Preferably M2 is Ti, V, Zr, Nb or Ta. The alloy composition should preferably have a metal element M2 content of 1 to 20 at %, more preferably 10 to 20 at %. An M2 content of less than 1 at % may make it difficult to prevent segregation of Si (or difficult refinement of Si phase), leading to degraded durability of the negative electrode material against charge/discharge cycles of a lithium ion battery. An M2 content in excess of 20 at % may interfere with Si phase formation.

The total content of metal elements M1 and M2 is preferably 15 to 40 at % of the alloy composition. A total content (M1+M2) of less than 15 at % may make it difficult to prevent segregation of Si (or refinement of Si phase) whereas a total content in excess of 40 at % may interfere with Si phase formation.

Figure 5A:
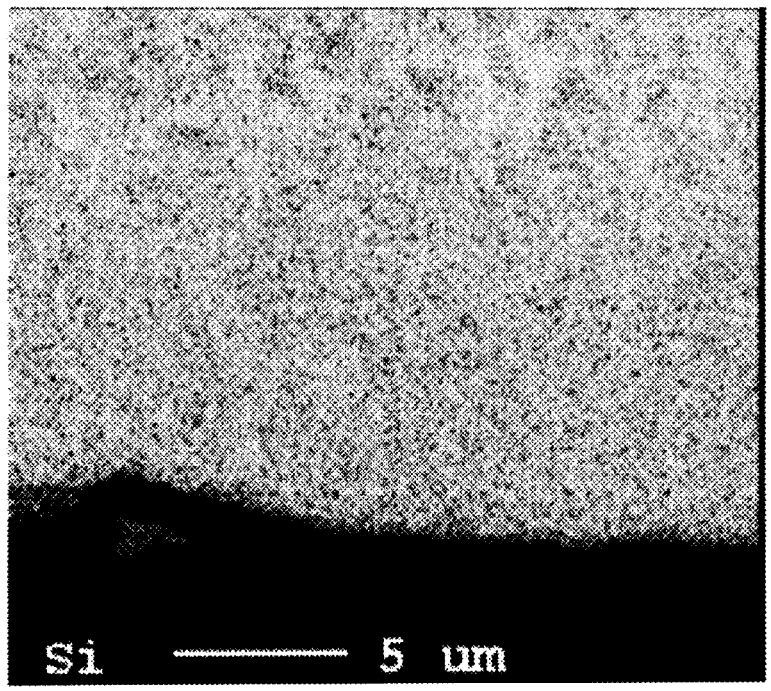
FIG. 5 is a mapping image showing a Si distribution by SPMA observation in cross section of quenched alloy samples in Comparative Example 1-3 and Example 3-4, FIG. 5(a) showing the Si distribution of Example 3-4 and FIG. 5(b) showing the Si distribution of Comparative Example 1-3.

It is preferred for the alloy material that the Si—Al-M1-M2 alloy have a Ti content of 1 to 20 at %. The reason is as follows. Since the Si—Al-M1-M2 alloy contains 40 to 70 at % of Si, a conventional melting process allows an excess of Si to be separated and precipitated during casting and results in large grains having the structure of two or more phases including Si phase (see the result of EPMA observation of the cast sample in FIG. 1(a)). According to the invention, the alloy material is rapidly solidified or quenched into a fine structure of two or more phases. The grain size of the structure largely varies with the content of Group 4 and 5 elements (in the Periodic Table) in the Si—Al-M1-M2 alloy. This grain size largely governs the cycle life of a lithium ion battery when the alloy material is used as the negative electrode material. As the grain size of the structure becomes finer, the cycle life becomes longer. In this regard, it is effective to add Ti to the alloy structure. Specifically addition of 1 to 20 at % of Ti facilitates refinement. Although the refinement mechanism is not well understood, Ti addition combined with quenching results in a finer structure than the addition of other elements of Groups 4 and 5 (compare quenched Si—Al—Fe—Ti sample of FIG. 1(b) with quenched Si—Al—Fe—V sample of FIG. 5(a)). Notably a Ti content of less than 1 at % may achieve no or little addition effect, whereas a Ti content in excess of 20 at % may result in an Si—Al-M1-M2 alloy having too high a melting point to melt.

The alloy material constituting the lithium ion battery negative electrode material has a structure wherein Si phase precipitates along boundaries of fine crystal grains of Si—Al-M1-M2 alloy phase to form networks as shown in FIG. 2.

The crystal grains of Si—Al-M1-M2 alloy phase preferably have a grain size of 1 to 500 nm, more preferably 50 to 300 nm. A grain size of less than 1 nm may lead to degraded durability of the negative electrode material against charge/discharge cycles of a lithium ion battery whereas a grain size in excess of 500 nm may make it difficult to provide a lithium ion battery with a high capacity.

The networks of Si phase result from precipitation of Si phase at the boundary between crystal grains. The fine networks of Si phase are uniformly exposed in a relatively large proportion on the surface of the alloy material.

The width of networks of Si phase, that is, the distance between crystal grains is preferably up to 200 nm, more preferably 1 nm to 200 nm. If the distance between crystal grains is less than 1 nm, then it is difficult to provide a lithium ion battery with a high capacity. If the distance between crystal grains exceeds 200 nm, then the Si phase region may undergo substantial expansion and contraction upon charge/discharge cycles, which causes powdering and formation of conductive paths to the collector, adversely affecting the cycle life.

The alloy material constituting the lithium ion battery negative electrode material is prepared, preferably by a rapid solidification or quenching process. More particularly, metal ingredients (single metal or alloy) corresponding to the constituent elements are weighed in accordance with the desired composition, fed into a crucible or suitable vessel, and melted by high-frequency induction heating, resistance heating or arc melting. The melt is cast into a mold to form an alloy ingot, which is melted again and rapidly solidified by gas atomization, disk atomization or chill roll quenching. There is obtained an alloy material having the desired crystalline structure. Although the melting process is not particularly limited, the rapid solidification process is preferred in producing the two-phase alloy material having a fine crystalline structure according to the invention.

The resulting alloy material is preferably powdered by mechanical grinding. The powdered alloy material is referred to as alloy powder. The grinding method is not particularly limited, and any of grinding machines including mortar, roll mill, hammer mill, pin mill, Brown mill, jet mill, ball mill, bead mill, vibration mill and planetary mill may be used. By a combination of these grinding means, the alloy is preferably ground to an average particle size of up to 4 µm, more preferably 1 to 4 µm. The grinding step is not necessary in the event of atomization wherein a particle size of up to 4 µm is inherently available.

The average particle size of the alloy powder is set to 4 µm or less for the purpose of improving the percent utilization of Si phase and the lifetime when the alloy powder is used as the negative electrode material in lithium ion batteries. If the average particle size of the alloy powder exceeds 4 µm, then the Si phase in the depth of the alloy powder does not contribute to charge/discharge (because Si alone or Si phase in the alloy material is in the form of a fine network structure), resulting in a reduced percent utilization and an accordingly reduced capacity. Also if the average particle size of the alloy powder exceeds 4 µm, then the Si phase may undergo substantial expansion and contraction upon charge/discharge cycles when the alloy powder is used as the negative electrode material in lithium ion batteries, and powdering and formation of conductive paths to the collector can occur, adversely affecting the cycle life. The average particle size of the alloy powder is set to 1 µm or more for ease of handling of the powder. It is noted that the average particle size of the alloy powder is measured by any well-known particle size measurement methods, for example, a particle size distribution measuring instrument based on laser diffractometry.

EXAMPLE

Examples and Comparative Examples are given below by way of illustration and not by way of limitation.

Example 1

Example 1-1

Metals Si, Al, Fe, and Ti were weighed in amounts of 40 at %, 25 at %, 20 at %, and 15 at %, respectively, into a resistance heating furnace where they were melted and cast into an alloy ingot.

The alloy ingot was placed in a quartz nozzle and mounted in a liquid quenching single roll unit (Makabe Giken Co., Ltd.) where it was melted in an argon gas atmosphere by high-frequency heating. The molten alloy was injected from the orifice of the nozzle by argon gas jet and impacted against the surface of a rotating chill roll of copper (circumferential speed of 20 m/sec) for rapid solidification. On solidification, the alloy traveled in a rotational direction of the roll and became a quenched thin body in ribbon form.

The quenched thin body was coarsely ground in a stainless steel mortar, classified to a particle size of up to 300 µm, and milled in a ball mill into a powder sample having an average particle size of 4 µm, designated Sample A.

It is noted that the average particle size of the alloy powder is measured by a particle size distribution measuring instrument based on laser diffractometry (SALD-7000 by Shimadzu Corp.)

Example 1-2

Another powder sample, designated Sample B, was prepared by the same procedure as in Example 1-1 except that the amount of metals Si, Al, Fe, and Ti was changed to 60 at %, 15 at %, 10 at %, and 15 at %, respectively.

Figure 1B:
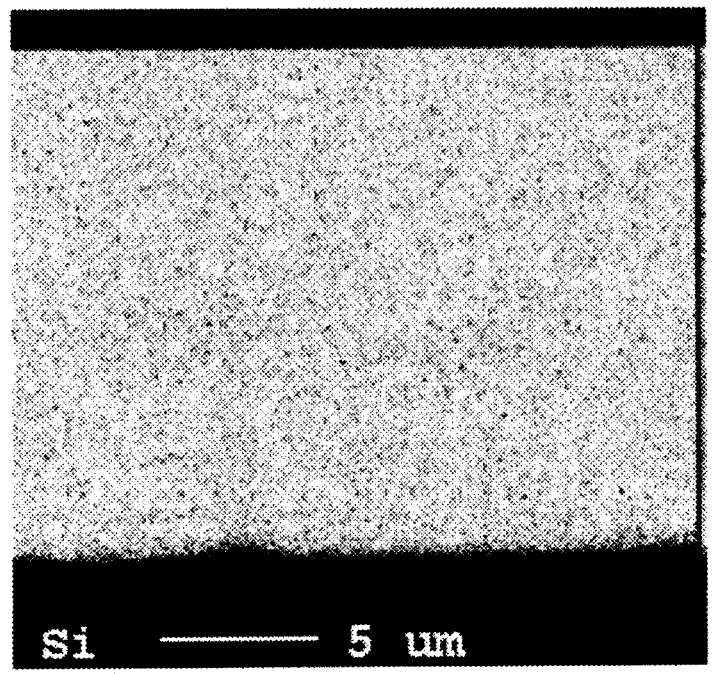

In this Example, the cross-sectional structure of an alloy sample in the alloy ingot stage (cast sample) and an alloy sample in the quenched thin body stage (quenched sample) was observed by electron probe micro-analysis (EPMA) to examine an Si distribution. The results are shown in FIG. 1. The cast sample had Si segregated (FIG. 1(a)) whereas the quenching resulted in a uniform distribution of Si in cross section (FIG. 1(b)).

Example 1-3

A further powder sample, designated Sample C, was prepared by the same procedure as in Example 1-1 except that the amount of metals Si, Al, Fe, and Ti was changed to 70 at %, 8 at %, 7 at %, and 15 at %, respectively.

Comparative Example 1-1

A further powder sample, designated Sample D, was prepared by the same procedure as in Example 1-1 except that the amount of metals Si, Al, Fe, and Ti was changed to 30 at %, 35 at %, 20 at %, and 15 at %, respectively.

Comparative Example 1-2

A further powder sample, designated Sample E, was prepared by the same procedure as in Example 1-1 except that the amount of metals Si, Al, Fe, and Ti was changed to 80 at %, 5 at %, 5 at %, and 10 at %, respectively.

Comparative Example 1-3

A further powder sample, designated Sample F, was prepared by the same procedure as in Example 1-1 except that the amount of metals Si, Al, Fe, and Ti was changed to 60 at %, 25 at %, 15 at %, and 0 at %, respectively. Sample F was intended to confirm the addition effect of Ti.

Comparative Example 1-4

A commercially available silicon powder (trade name: silicon powder, average particle size 4 µm, Wako Pure Chemical Industries, Ltd.) was used as a powder sample, designated Sample G.

Evaluation Methods and Results
1) Charge/Discharge Test

The powder sample, prepared above, was mixed with a solution of a polyimide binder in N-methyl-2-pyrrolidone. The slurry was coated onto a copper current collector and heat dried to form an electrode sheet. Using the electrode sheet, metallic lithium as the counter electrode, and a solution of 1 mol/liter $LiPF_6$ in ethylene carbonate and diethyl carbonate (1/1 by volume) as the electrolyte, a CR2032 coin battery for test was constructed. A charge/discharge test was carried out over 50 cycles under conditions: temperature 20° C., voltage range 0 to 2 volts, and 0.1 C for both charge and discharge. A discharge capacity (mAh per gram of negative electrode material or powder sample) was measured at 1st and 50th cycle, from which a capacity retention was computed as (50th cycle discharge capacity)/(1st cycle discharge capacity)×100%, abbreviated as "DC@50th/DC@1st" in Tables.

It is understood that in this test, the negative electrode material within the scope of the invention was used as the positive electrode of a test lithium battery (or coin battery), with the intention of evaluating in a simple manner the durability against occlusion and release of Li ions occurring at the positive electrode (the negative electrode material within the scope of the invention) during charge/discharge cycles of a coin battery (lithium battery).

The results are shown in Table 1.

TABLE 1

| | Composition (at %) | | | | Charge/discharge test | | |
|---|---|---|---|---|---|---|---|
| | | | | | Discharge capacity (mAh/g) | | Capacity retention |
| Sample | Si | Al | Fe | Ti | 1st cycle | 50th cycle | (DC@50th/DC@1st, %) |
| A (Example 1-1) | 40 | 25 | 20 | 15 | 500 | 490 | 98.0 |
| B (Example 1-2) | 60 | 15 | 10 | 15 | 750 | 728 | 97.1 |
| C (Example 1-3) | 70 | 8 | 7 | 15 | 880 | 854 | 97.0 |
| D (Comparative Example 1-1) | 30 | 35 | 20 | 15 | 140 | 135 | 96.4 |
| E (Comparative Example 1-2) | 80 | 5 | 5 | 10 | 1600 | 200 | 12.5 |
| F (Comparative Example 1-3) | 60 | 25 | 15 | — | 750 | 450 | 60.0 |
| G (Comparative Example 1-4) | 100 | — | — | — | 2750 | 151 | 5.5 |

As seen from Table 1, Examples 1-1 to 1-3 having an Si content in the range of 40 to 70 at % show high values of both 1st cycle discharge capacity and capacity retention. In contrast, Comparative Example 1-1 containing 30 at % Si shows a low 1st cycle discharge capacity despite a high capacity retention. Comparative Example 1-2 containing 80 at % Si shows a high 1st cycle discharge capacity, but a low capacity retention next to that of Si alone in Comparative Example 1-4. The capacity retention of Example 1-2 is higher than that of Comparative Example 1-3, proving the effect of Ti addition.

2) Structure Observation and Composition Analysis

For powder Sample B of Example 1-2 and powder Sample F of Comparative Example 1-3, the structure of the material was observed under transmission electron microscope (TEM). The results are shown in FIG. 2.

Figure 2A:
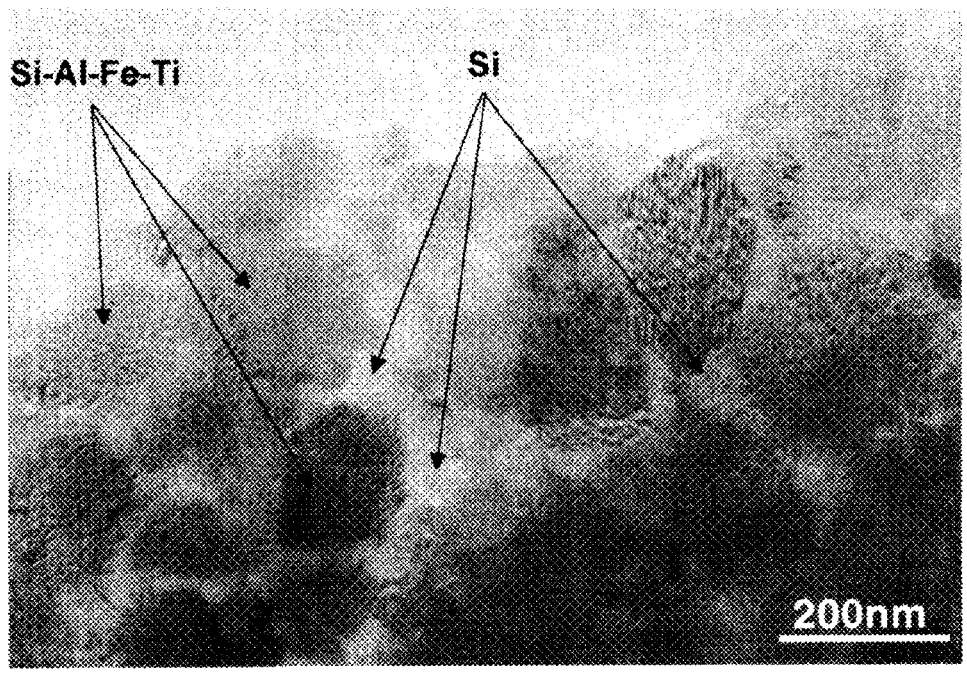
FIG. 2 is a TEM photomicrograph showing the structure of alloy materials in Example 1-2 and Comparative Example 1-3, FIG. 2(a) showing the structure of Example 1-2 and FIG. 2(b) showing the structure of Comparative Example 1-3.
Figure 2B:
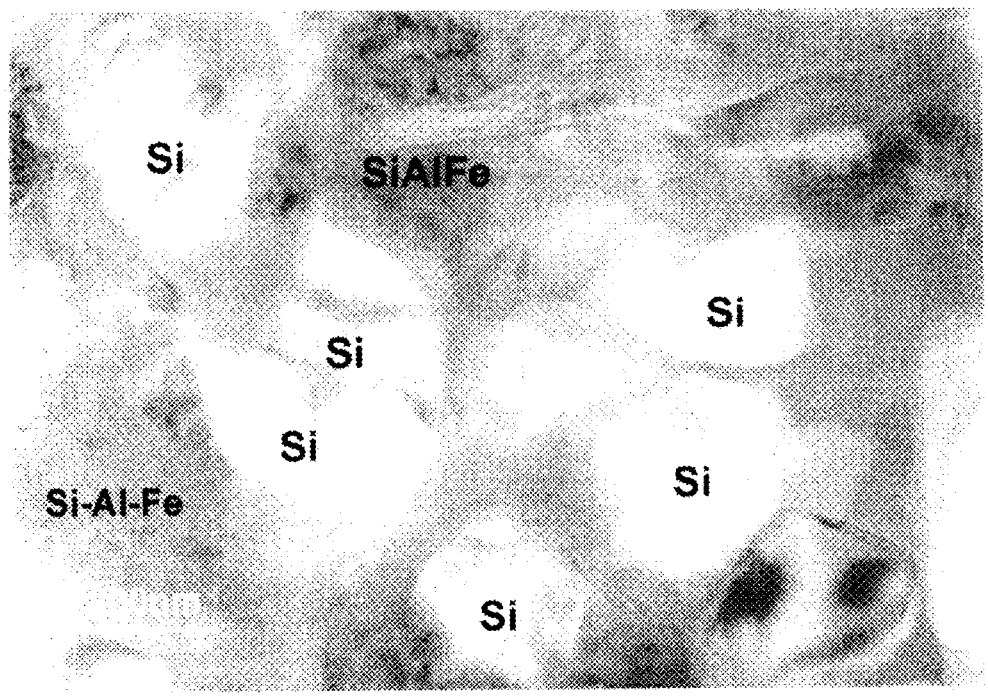

FIG. 2(a) corresponding to Example 1-2 shows a structure consisting of gray granular regions and white regions enclosing the gray regions and connected as networks. FIG. 2(b) corresponding to Comparative Example 1-3 shows a structure based on a gray region having white granular regions sparsely dispersed therein.

Next, the gray and white regions on structure observation of Sample B of Example 1-2 and Sample F of Comparative Example 1-3 were analyzed for composition by energy dispersive X-ray spectroscopy (EDX). The results are shown in Tables 2 and 3.

TABLE 2

| | Sample B of Example 1-2 | | | | | | | |
|---|---|---|---|---|---|---|---|---|
| Region observed | Analysis value (wt %) | | | | Analysis value (at %) | | | |
| | Si | Al | Fe | Ti | Si | Al | Fe | Ti |
| Gray region-1 | 44.52 | 11.42 | 16.27 | 27.78 | 55.0 | 14.7 | 10.1 | 20.2 |
| Gray region-2 | 46.48 | 4.8 | 17.81 | 30.91 | 59.2 | 6.4 | 11.4 | 23.1 |
| Gray region-3 | 50.29 | 8.6 | 5.23 | 35.88 | 60.6 | 10.8 | 3.2 | 25.4 |
| Gray region-4 | 44.14 | 10.21 | 18.00 | 27.65 | 55.1 | 13.3 | 11.3 | 20.3 |
| Gray region-3 | 42.83 | 12.78 | 20.47 | 23.92 | 53.2 | 16.5 | 12.8 | 17.4 |
| Gray region-6 | 42.45 | 12.09 | 17.07 | 28.39 | 52.9 | 15.7 | 10.7 | 20.8 |
| Gray region-7 | 44.63 | 9.71 | 19.23 | 26.42 | 55.8 | 12.7 | 12.1 | 19.4 |
| White region-1 | 100 | 0 | 0 | 0 | 100 | 0 | 0 | 0 |
| White region-2 | 100 | 0 | 0 | 0 | 100 | 0 | 0 | 0 |

TABLE 3

| | Sample F of Comparative Example 1-3 | | | | | |
|---|---|---|---|---|---|---|
| Region observed | Analysis value (wt %) | | | Analysis value (at %) | | |
| | Si | Al | Fe | Si | Al | Fe |
| Gray region-1 | 32.31 | 27.22 | 40.47 | 39.9 | 35.1 | 25.1 |
| Gray region-2 | 31.30 | 28.80 | 39.90 | 38.5 | 37.0 | 24.7 |
| Gray region-3 | 38.61 | 29.74 | 31.65 | 45.2 | 36.3 | 18.6 |
| Gray region-4 | 31.89 | 28.96 | 39.16 | 39.0 | 37.0 | 24.1 |
| Gray region-5 | 32.24 | 29.09 | 37.67 | 39.6 | 37.3 | 23.3 |
| White region-1 | 100 | 0 | 0 | 100 | 0 | 0 |
| White region-2 | 100 | 0 | 0 | 100 | 0 | 0 |

As seen from the analytical data, the white region consisted of 100% Si in both Example 1-2 (Sample B) and Comparative Example 1-3 (Sample F). The gray region had an alloy composition of Si—Al—Fe—Ti in Example 1-2 (Sample B) and an alloy composition of Si—Al—Fe in Comparative Example 1-3 (Sample F). The gray regions in Samples B and F had a lower Si content (at %) than the raw material composition (Table 1), because Si not contributing to alloying precipitated in the alloy as a single phase.

Based on the above analytical results, the structure of powder Samples B and F was observed, finding that Sample F free of Ti in Comparative Example 1-3 had a Si distribution that Si phase is distributed in the Si—Al—Fe matrix alloy as sparse granular spots (FIG. 2(b)), whereas Sample B having Ti added in Example 1-2 had a Si distribution that Si phase is distributed as networks along boundaries between crystal grains of the Si—Al—Fe—Ti alloy phase (FIG. 2(a)). The crystal grains of the Si—Al—Fe—Ti alloy phase in Sample B of Example 1-2 had a grain size of about 50 to 300 nm. The width of networks of Si phase, that is, the distance between crystal grains was less than 100 nm in Example 1-2 in contrast to a distance of more than 200 nm in Comparative Example 1-3.

Example 2

Using the alloy material of Example 1-2, the particle size or degree of milling was examined.

The quenched thin body of Example 1-2 as coarsely ground was milled in a stainless steel ball mill pot using stainless steel balls and n-hexane as the medium. The degree of milling was controlled in terms of milling time, obtaining Powder Samples H, I, J, and K having an average particle size of 1.9, 3.5, 5.0, and 11.6 μm.

Using the powder sample thus obtained, a CR2032 coin battery for test was constructed as in Example 1 and subjected to a charge/discharge test. The results are shown in FIG. 3 and Table 4.

TABLE 4

| Sample | Average particle size (μm) | Charge/discharge test | | Capacity retention (DC@50th/DC@1st, %) |
|---|---|---|---|---|
| | | Discharge capacity (mAh/g) | | |
| | | 1st cycle | 50th cycle | |
| H (Example 2-1) | 1.9 | 850 | 825 | 97.1 |
| I (Example 2-2) | 3.5 | 720 | 699 | 97.1 |
| J (Comparative Example 2-1) | 5.0 | 620 | 465 | 75.0 |
| K (Comparative Example 2-2) | 11.6 | 504 | 309 | 61.4 |

Figure 3A:
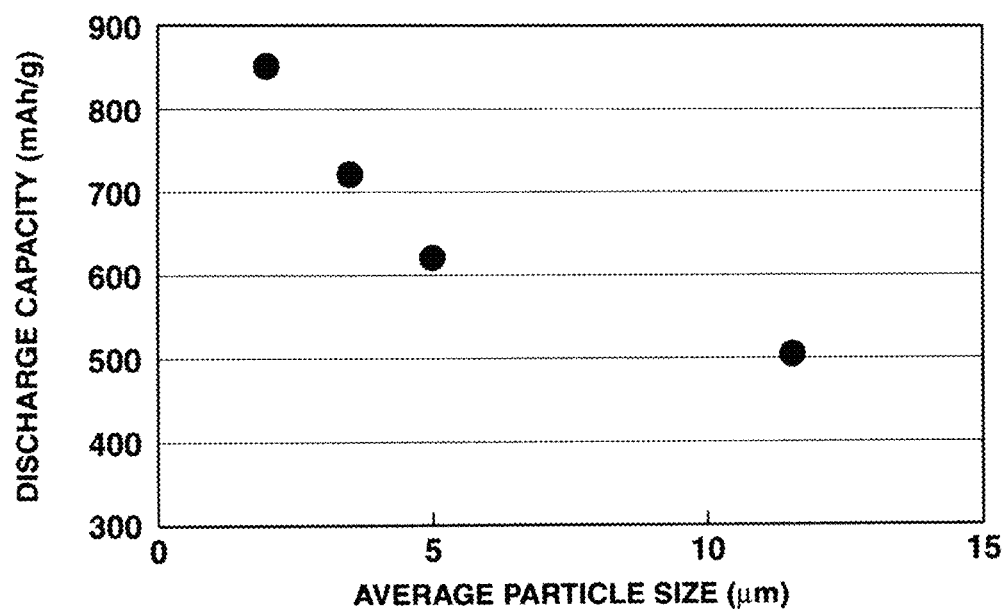
FIG. 3 is a graph showing a discharge capacity per weight and a capacity retention relative to average particle size in Example 2, FIG. 3(a) showing a discharge capacity of 1st cycle relative to average particle size and FIG. 3(b) showing a capacity retention relative to average particle size.
Figure 3B:
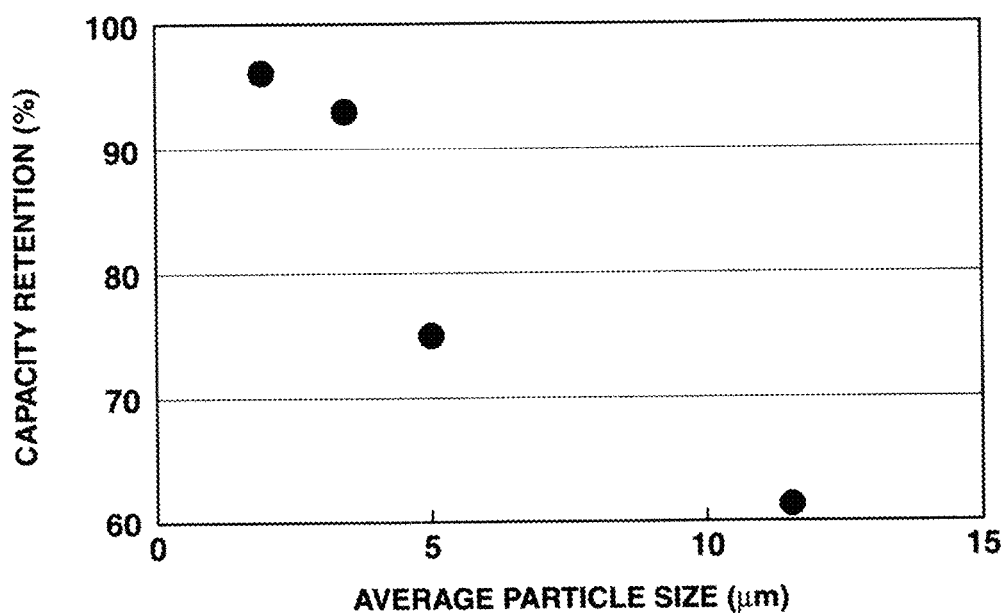

Acknowledged from FIG. 3 and Table 4 is a tendency that as the average particle size of powder sample becomes smaller, the 1st cycle discharge capacity and capacity retention are improved. As also understood from the observation results of FIG. 2, this is probably because a powder sample having a larger particle size, in which Si phase in the depth of the powder sample does not contribute to reaction with Li ions, has a reduced discharge capacity per unit weight. Also, a powder sample having a larger particle size indicates greater expansion per particle so that the resultant stress may exceed the binding force of the binder to form conductive paths to the collector, leading to a reduced capacity retention.

Example 3

This example investigated the type of metal element to be added to Si—Al base alloy. Specifically, Powder Samples L to S having an average particle size of 1.9 μm were prepared by starting with the alloy composition ($Si_{60}Al_{15}Fe_{10}Ti_{15}$) of Example 1-2, modifying the additive metal element as shown below, and milling as in Example 2-1. Using the powder sample thus obtained, a CR2032 coin battery for test was constructed as in Example 1 and subjected to a charge/discharge test.

Replacement 1

Powder Samples L, M, N and O were obtained by selecting metal element M1 in compositional formula (1):

$$Si_{60}Al_{15}M1_{10}Ti_{15} \quad (1)$$

from the group of nil, Ni, Co, and Mn. It is noted that the composition wherein M1 is nil is $Si_{60}Al_{25}Ti_{15}$.

Replacement 2

Powder Samples P, Q, R and S were obtained by selecting metal element M2 in compositional formula (2):

$$Si_{60}Al_{15}Fe_{10}M2_{15} \quad (2)$$

from the group of V, Zr, Nb, and Ta.

The results are shown in Table 5.

TABLE 5

| Sample | Replacement element | Charge/discharge test | | Capacity retention (DC@50th/DC@1st, %) |
|---|---|---|---|---|
| | | Discharge capacity (mAh/g) | | |
| | | 1st cycle | 50th cycle | |
| L (Comparative Example 3-1) | M1: nil | 1800 | 150 | 8.3 |
| M (Example 3-1) | M1: Ni | 850 | 825 | 97.1 |
| N (Example 3-2) | M1: Co | 820 | 804 | 98.0 |
| O (Example 3-3) | M1: Mn | 830 | 798 | 96.2 |
| P (Example 3-4) | M2: V | 850 | 833 | 98.0 |
| Q (Example 3-5) | M2: Zr | 800 | 784 | 98.0 |
| R (Example 3-6) | M2: Nb | 780 | 770 | 98.7 |
| S (Example 3-7) | M2: Ta | 800 | 776 | 97.0 |

Figure 4A:
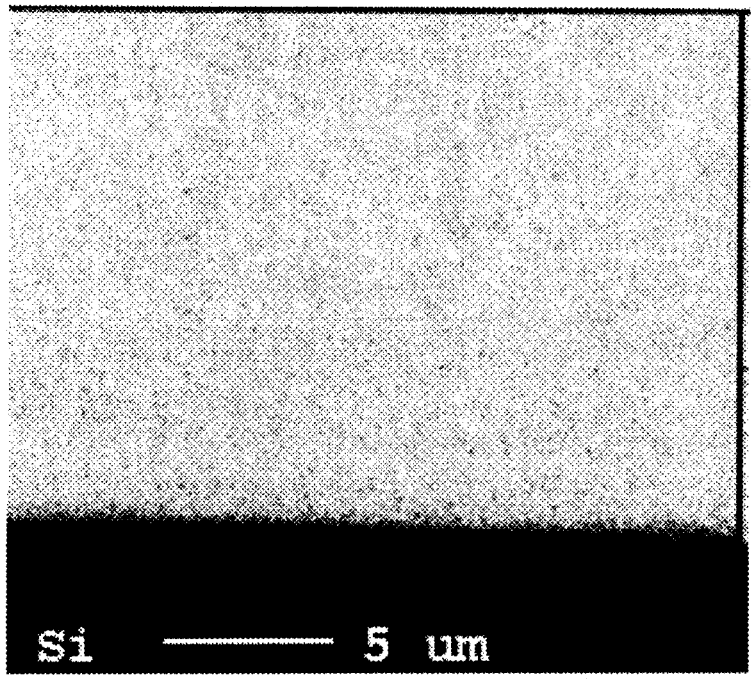
FIG. 4 is a mapping image showing a Si distribution by SPMA observation in cross section of quenched alloy samples in Comparative Example 3-1 and Example 3-2, FIG. 4(a) showing the Si distribution of Example 3-2 and FIG. 4(b) showing the Si distribution of Comparative Example 3-1.
Figure 4B:
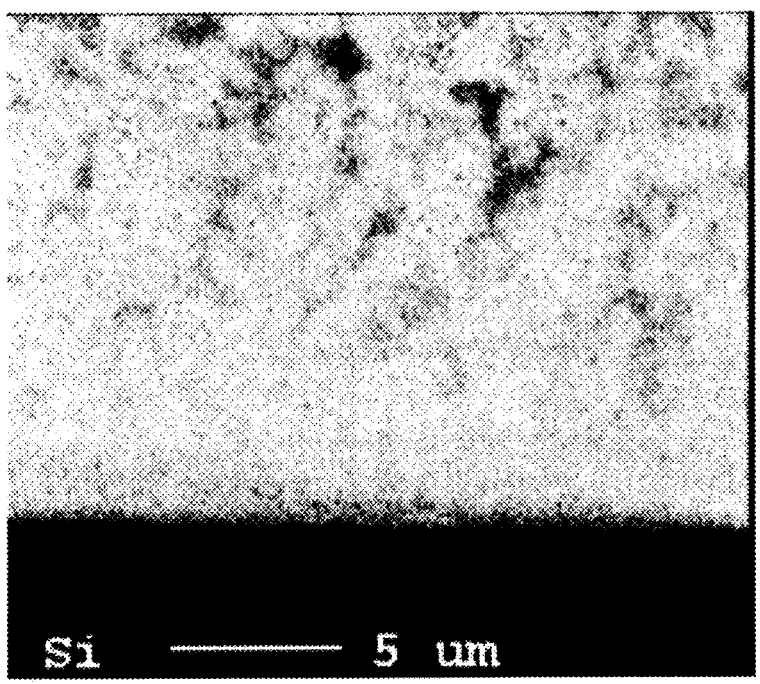

As seen from Table 5, Sample L of Comparative Example 3-1 free of metal element M1 (i.e., free of any transition metals defined herein) shows a high 1st cycle discharge capacity, but an extremely reduced capacity retention after 50 cycles. This is because of noticeable segregation of Si, as also seen from the Si distribution in the cross-sectional structure of the quenched thin body stage (quenched sample) shown in FIG. 4. Example 3-2 containing transition metal M1 (e.g., Co in FIG. 4(*a*)) has little of Si segregated, that is, a relatively uniform distribution of Si, as shown in FIG. 4(*a*), whereas Comparative Example 3-1 free of transition metal M1 has substantial segregation of Si, that is, large crystal grains of Si phase as shown in FIG. 4(*b*). If the size of crystal grains of Si phase in the alloy is large, the Si phase undergoes substantial expansion and contraction during charge/discharge, which causes powdering and formation of conductive paths to the collector, adversely affecting the cycle life.

Figure 5B:
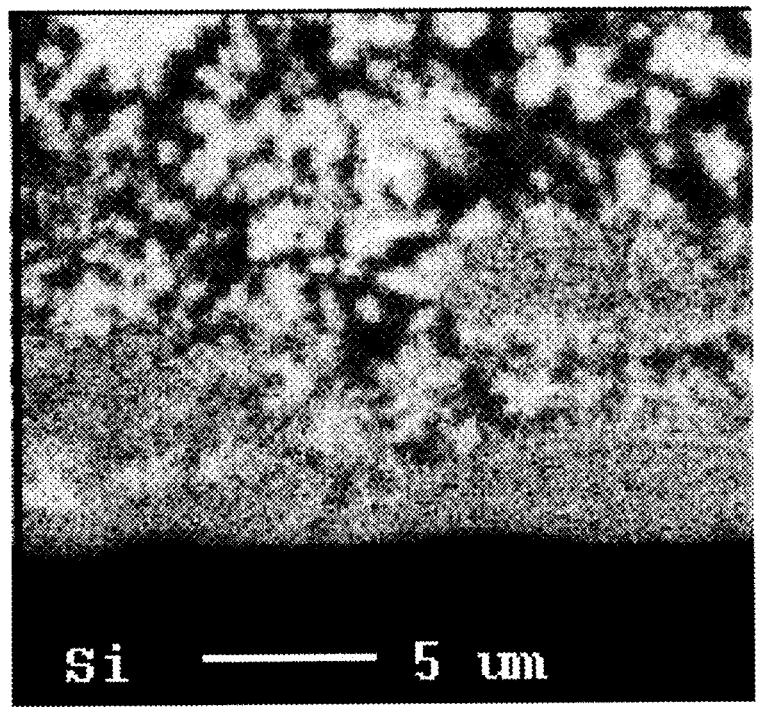

The powder sample free of metal element M2 (i.e., free of any elements of Groups 4 and 5) like Comparative Example 1-3 shows a relatively high 1st cycle discharge capacity and a poor capacity retention after 50 cycles. This is probably because of noticeable segregation of Si, as also seen from the Si distribution in the cross-sectional structure of the quenched thin body stage (quenched sample) shown in FIG. 5. Example 3-4 containing metal element M2 of Groups 4 and 5 (e.g., V in FIG. 5(*a*)) has little of Si segregated, that is, a relatively uniform distribution of Si, as shown in FIG. 5(*a*), whereas Comparative Example 1-3 free of metal element M2 has substantial segregation of Si as shown in FIG. 5(*b*). Like the sample free of transition metal M1, the crystal grains of Si phase are large, which causes a degradation of cycle life.

It is recognized from the foregoing that the co-inclusion of at least one transition metal (exclusive of the metal elements of Groups 4 and 5 in the Periodic Table) and at least one metal element of Groups 4 and 5 in the Periodic Table in the Si—Al alloy functions to make the Si phase more uniform and finer by virtue of their synergy. That is, the alloy material prepared according to the invention consists of an Si—Al-M1-M2 alloy phase constituting fine crystal grains and a fine Si phase extending along crystal grain boundaries as networks and affords a lithium ion battery negative electrode material featuring a high capacity and long lifetime.

While the present invention has been described with references to preferred embodiments, various changes or substitutions may be made to these embodiments by those ordinarily skilled in the art pertinent to the present invention without departing from the technical scope of the present invention. Therefore, the scope of the present invention encompasses not only those embodiments described above, but also all that fall within the scope of the appended claims.

Japanese Patent Application No. 2011-249620 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A negative electrode material for lithium ion batteries, comprising an alloy consisting essentially of 40 to 70 at % of Si, 1 to 25 at % of Al, 7 to 35 at % of M1, and 17.4 to 25.4 at % of M2 wherein M1 is at least one element selected from the transition metals exclusive of Groups 4 and 5 in the Periodic Table, and M2 is at least one metal element selected from Groups 4 and 5 in the Periodic Table, and having an Si—Al-M1-M2 alloy phase constituting fine crystal grains and an Si phase precipitating along boundaries of the crystal grains to form a network.

2. The negative electrode material of claim 1 wherein M1 is an element selected from the group consisting of Fe, Ni, Co, and Mn.

3. The negative electrode material of claim 1 wherein M2 is an element selected from the group consisting of Ti, V, Zr, Nb, and Ta.

4. The negative electrode material of claim 1 wherein the alloy material contains 17.4 to 20 at % of M2.

5. The negative electrode material of claim 1 wherein M2 is Ti.

6. The negative electrode material of claim 1 wherein the crystal grains has a size of 1 to 500 nm and are spaced apart a distance of up to 200 nm.

7. The negative electrode material of claim 1 which is prepared by the rapid solidification process.

8. The negative electrode material of claim 1 wherein the alloy material is in particulate form having an average particle size of up to 4 μm.

9. The negative electrode material of claim 1, wherein the alloy material contains 50-70 at % of Si.

10. The negative electrode material of claim 1, wherein the alloy material contains 8-25 at % of Al.

11. The negative electrode material of claim 1, wherein the alloy material contains 7-20 at % of M1.

* * * * *